United States Patent Office 3,382,864
Patented May 14, 1968

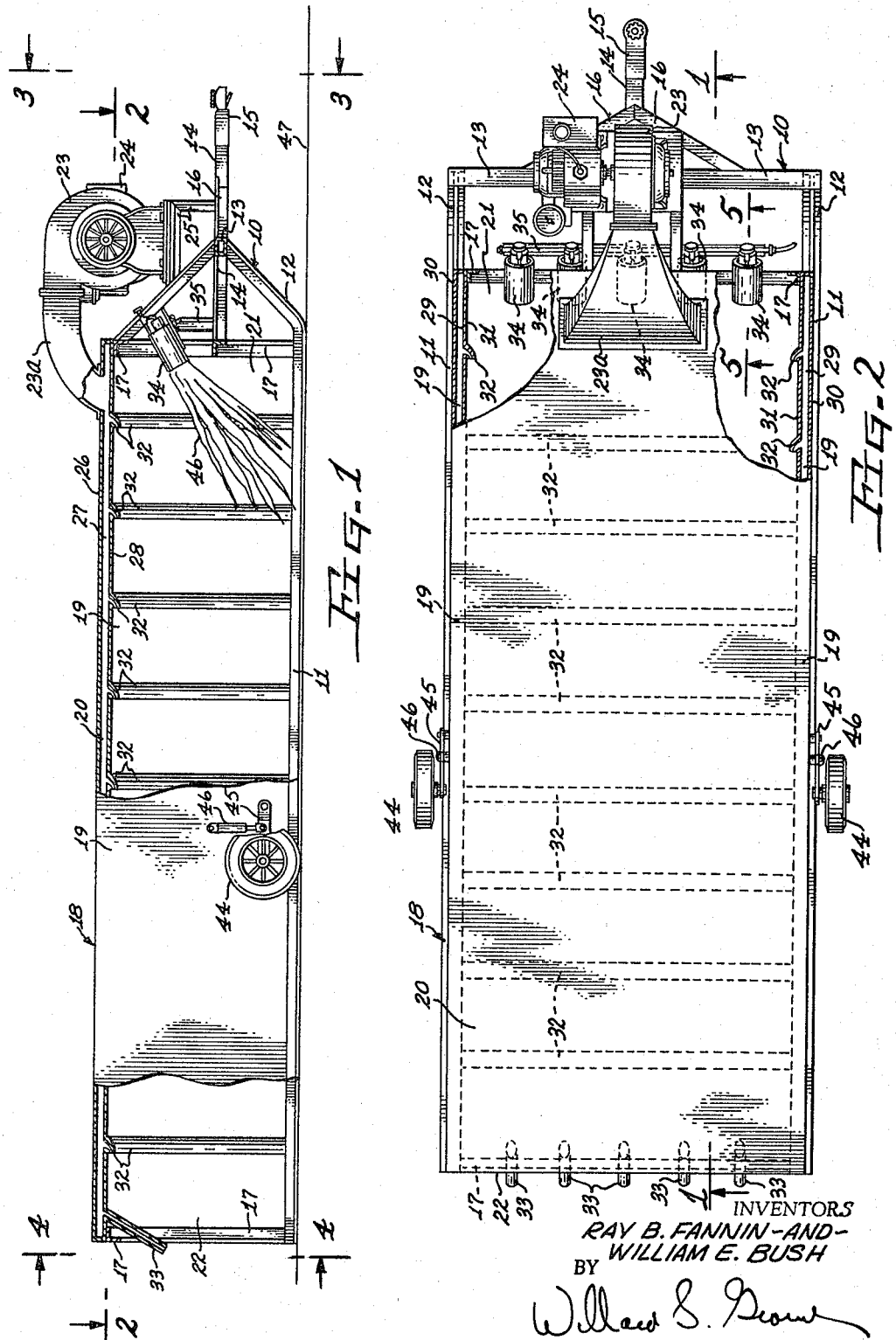

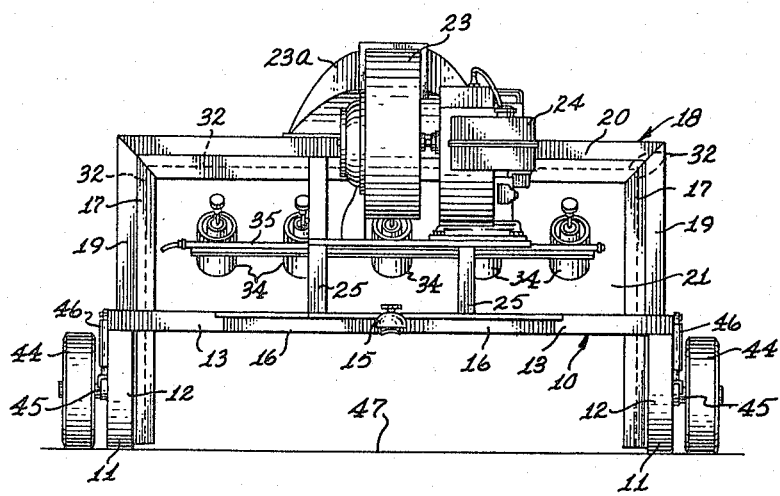

3,382,864
AGRICULTURAL INCINERATOR
Ray B. Fannin, 226 E. McKinley, Tempe, Ariz. 85281, and William E. Bush, Scottsdale, Ariz.; said Bush assignor to said Fannin
Substituted for abandoned application Ser. No. 453,996, May 7, 1965. This application Sept. 5, 1967, Ser. No. 675,996
1 Claim. (Cl. 126—271.2)

ABSTRACT OF THE DISCLOSURE

An agricultural incinerator traveling over a field surface to treat, burn and destroy insects and infected trash in a field surface to prevent recurrent infestations of harmful insects on subsequent crops.

Cross-references to related applications

This is a re-filed application of abandoned application Ser. No. 453,996, filed May 17, 1965.

Background of the invention (1) The field of this invention lies in agricutural machinery and more particularly in incinerator devices for sterilizing and killing insects on and near the surface of a field to be subsequently planted in crops.

(2) Heretofore, incinerating apparatus for the above purposes were ineffective when done openly without a cover over the incinerating flames because of loss of concentrated heat on the field surface. Also, when plan covers, hoods or tunnels were used, they could burn out or fail to provide the proper oxidizing and burning action to irradicate the objectionable insects.

Summary of the invention

One of the objects of this invention is to provide a dirigible agricultural incinerator for progressively burning, incinerating, and sterilizing a crop row in a field.

Still another object of this invention is to provide an agricultural incinerator which may be pulled along the surface of a field to incinerate and destroy the trash, sticks and insect infested materials in a field after the crop has been harvested.

It is a further object of this invention to provide an agricultural incinerator which may be passed over the field surface to heat the top layers of the ground surface to kill all insect and other contaminents in the soil so as to sterilize the same for the plating of the next year's crop.

It is also a further object of this invention to provide a high temperature agricultural incinerator which may be passed over a field surface to destroy the trash and insect matter with a minimum of smoke and air polluting discharges from the device.

It is a still further object of the invention to provide an elongated incinerator device for pulling over the surface of a field which has initial heating burners, preferably gas fired, for initially burning the material as the incinerator moves over it and then to provide a strong oxidizing atmosphere in the subsequent portions of the incinerator to consume all of the materials therein and to discharge the consumed materials with a minimum of air polluting smoke and gasses being present.

It is an object of this invention to provide the oxidizing air as a source for insulating and protecting the incinerator housing containing the burning materials therein.

Brief description of the drawings

FIG. 1 is an enlarged sectional view on the line 1—1 of FIG. 2 showing a vertical section through the incinerator apparatus.

FIG. 2 is a plan view partly in section on the line 2—2 of FIG. 1.

FIG. 3 is a front end elevation of the apparatus of FIGS. 1 and 2.

FIG. 4 is a rear end elevation of the apparatus shown in FIGS. 1 and 2.

FIG. 5 is an enlarged sectional view of one of the burners on the line 5—5 of FIG. 2.

Description of the preferred embodiment

As an example of one embodiment of this invention, there is shown an agricultural incinerator comprising a frame 10 consisting of a pair of laterally spaced skids 11 having upwardly and forwardly sloping forward portions 12 connected together at their upper forward ends by suitable tie bars 13 to which is fixed the towing hitch bracket 14 having the hitch piece 15 fixed to its forward extension 16.

A suitable superstructure framework 17 is carried on top of the skids 11 and supports in proper operative position the elongated incinerating hood 18 comprising the hollow side portions 19 and communicating hollow top portion 20 forming air ducts completely surrounding the sides and top portions of the hood 18. The front end 21 and the rear end 22 of the hook 18 are open. A suitable high volume air supply blower 23 driven by a suitable engine 24 is mounted on the brackets 25 suitably fixed to the hitch bracket 16 and has a discharge pipe 23a connected through the outer panel 26 of the top of the hood 18 to communicate with the air duct passageway 27 formed between the top outer panel 26 and the top inner panel 28. The air duct passageway 27 in the top extends laterally and is in communication with the air duct passageway 29 formed by the side outer panels 30 and the side inner panels 31 of the sides of the hood 18.

Extending laterally across the top inner panel 28 and the side inner panels 31 at spaced longitudinal positions in the hood 18 are the air discharge louvers 32 which are arranged to discharge air rearwardly of and substantially parallel to the inner surfaces of the inner top and side panels 28 and 31. Air discharges nozzles 33 communicating with the rear end of the top air duct passageway 27 are presented in the rear open end 22 of the hood 18.

A series of laterally spaced gas burners 34, such as shown in detail in FIG. 5, are mounted on a suitable supporting frame 35 on the hitch bracket members 14 in the front opening 21 of the hood 18. Each burner may comprise a combustion chamber 36 containing the fuel superheater coil 37 connected at one end to a fuel supply pipe 38 connected at its other end to the burner supply pipe 39 connected through the gas regulating valve 40 in turn connected to the gas injection nozzle 41 in the mixing tube 42. An outer sleeve longitudinally movable by the control lever 43 serves to increase or decrease the amount of flame applied to the fuel superheater coil in the combustion chamber 36 to vary the rate of burning and output of the burner to meet the nature and character of the field conditions and material to be incinerated.

Suitable ground support wheels 44 carried on suitable brackets 45 vertically movable relative to the skids 11 by suitable power actuable cylinders 46 serves to raise the skids off of the ground for maneuvering the unit and maintaining desired ground pressure and clearance of the skids during the incinerating operations along the plant rows.

In operation: when the hitch piece 15 is attached to a tractor so that the unit may be towed along the field surface along the plant rows and with the ground support wheels appropriately adjusted for proper clearance or pressure of the skids 11 on the ground surface, the burners 34 apply a hot blasting flame 46 rearwardly and downwardly of the hood 18 as the plants move in through the open front end 21 of the unit. The burners also apply a hot blast against the ground surface 47 to raise the temperature of the first several inches thereof sufficient to burn out, kill, and sterilize this ground of all insect pests and fungus growths. As the ignited plants from the burner flames 46 moves rearwardly further into the hood 18 the oxidizing air blast from the air discharge louvers continues burning of the pre-heated and partly incinerated plants so that they are completely consumed by the time they finally come out at the rear end of the hood. The air discharge nozzles 33 at the rear open end 22 of the hood further assure complete burning and oxidation of the flammable material initially set afire by the burner flames 46. It is important to note that in addition to the oxidizing atmosphere provided throughout the hood 18 by air discharged from the blower 23 through the louvers 32, this same air blast coming out of these louvers serves to protect the inner surface panels 28 and 31 from the excessive heat of incineration and oxidation of the plant materials to thus maintain the heat therein without affecting the hood panels and preventing their warping, melting or becoming misshapen by the excessive burden that occurs normally within the hood during the incineration process. By appropriately regulating the rate of burning of burners 34 and the oxidizing air supply by the fan 23 a completely incinerated pass over the plant row is accomplished and with a minimum of smoke and air pollution discharges from the incinerator, to thus provide a highly efficient unit and one acceptable to the restrictions of air pollution control in the areas where such operations would be sensitive to the surrounding population centers.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

We claim:
1. An agricultural incinerator comprising in combination:
 (A) a frame,
 (B) a longitudinally extending hood on said frame having,
 (C) a hollow top and sides forming an air duct passageway betwen spaced outside and inside panels forming said top and sides,
 (D) an air supply blower on said frame connected to supply air to said air duct passageway of said hood,
 (E) laterally extending longitudinally spaced air discharge louvers in the inside panels of said hood discharging air adjacent to and substantially parallel to the inside surfaces of said inside panels,
 (F) burners at one end of said hood discharging flames in the direction of air discharge from said louvers,
 (G) means for moving said frame and hood along a plant row so that the ground surface and plant refuse to be incinerated enter said hood at the burner end thereof and leaves said hood at the other end thereof,
 (H) said air moving in said air duct passageways serving to cool said top and sides of said hood to prevent excessive heat being developed therein from the incinerating and burning operation within said hood.

References Cited
UNITED STATES PATENTS

| | | | |
|---|---|---|---|
| 1,458,070 | 6/1923 | Long et al. | 126—271.2 X |
| 1,857,603 | 5/1932 | Peters | 126—271.2 |
| 1,943,218 | 1/1934 | Guttormson | 126—271.3 |
| 2,725,875 | 12/1955 | Broad | 126—271.2 |

CHARLES J. MYHRE, *Primary Examiner.*